(No Model.)
J. M. MAY.
CAR AXLE.
No. 420,307. Patented Jan. 28, 1890.
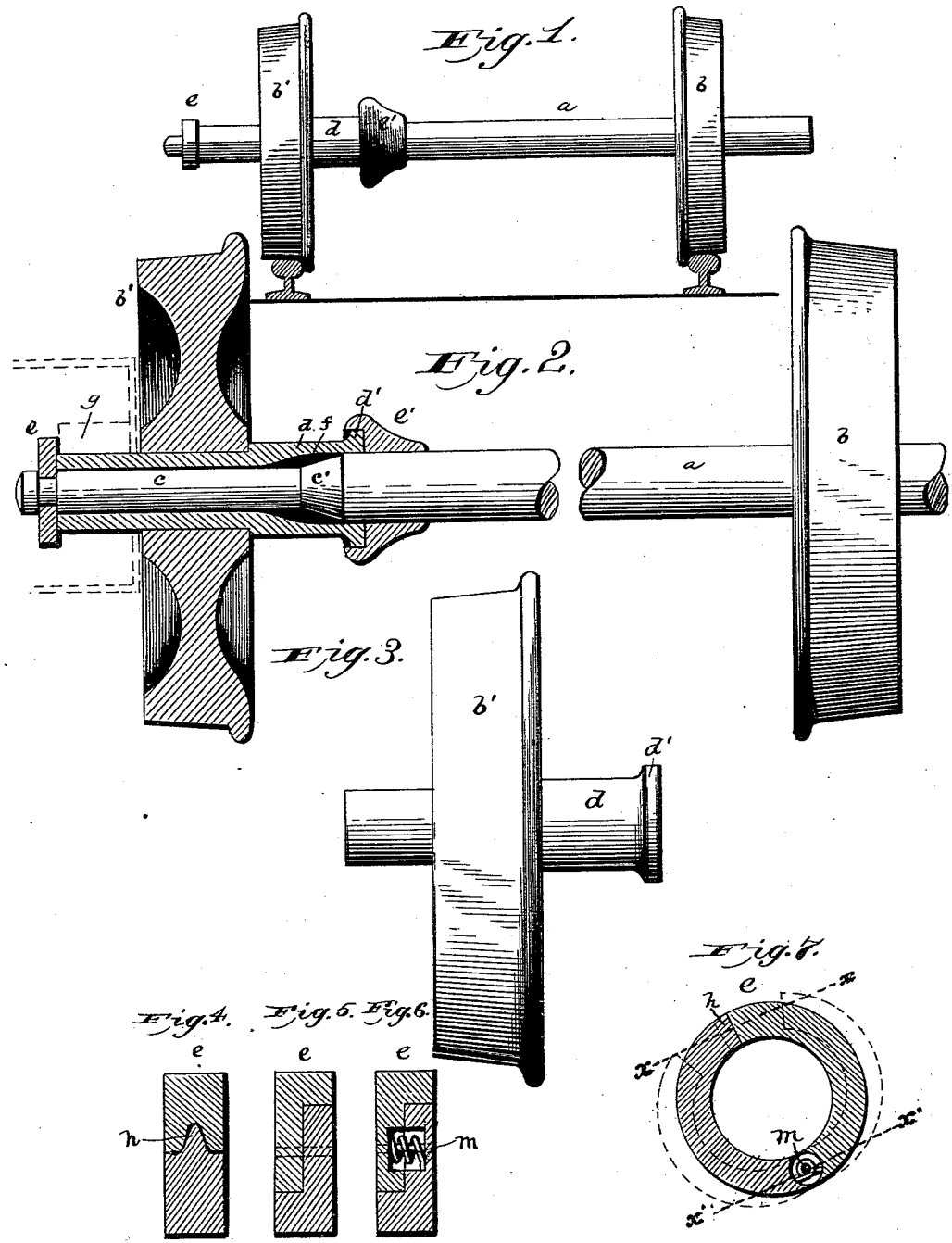
Witnesses
Jno. S. Finch
C. D. Davis
Inventor
John M. May
By his Attorneys
C. M. Alexander

UNITED STATES PATENT OFFICE.

JOHN M. MAY, OF CEDAR RAPIDS, IOWA.

CAR-AXLE.

SPECIFICATION forming part of Letters Patent No. 420,307, dated January 28, 1890.

Application filed July 9, 1889. Serial No. 316,923. (No model.)

*To all whom it may concern:*

Be it known that I, JOHN M. MAY, a citizen of the United States, residing at Cedar Rapids, in the county of Linn and State of Iowa, have invented certain new and useful Improvements in Car-Axles, of which the following is a specification, reference being had therein to the accompanying drawings, in which—
Figure 1 represents a side elevation of my improved car-axle complete; Fig. 2, a vertical sectional view of the same, partly in side elevation; Fig. 3, a detail view of the car-wheel provided with the hollow journal, and Figs. 4, 5, 6, and 7 detail sectional views of the detachable collar and washer.

The object of the invention is essentially to improve and render more efficient the general construction covered by Letters Patent issued to me upon the 25th day of August, 1874, the present improvements serving to reduce the friction between the wheels and rails (especially upon curves) to a minimum, thereby enabling the cars to be moved with less power and wear, as will be more fully hereinafter set forth.

The invention consists in certain novel features of construction and arrangement of parts hereinafter set forth.
In the drawings annexed, $a$ designates the main axle, having rigidly secured to it at one end the car-wheel $b$, and having its other end $c$ somewhat reduced in diameter, the larger portion of the axle being connected to the smaller portion by a beveled portion $c'$. This reduced portion of the axle is journaled in a tubular journal $d$, secured rigidly within the hub of the car-wheel $b'$, and is held therein by a divided collar $e$, clamped in an annular groove in the end of the axle. The tubular journal $d$ extends inwardly a sufficient distance to embrace the adjacent end of the main axle $a$, its passage being sufficiently enlarged to snugly fit the axle. The inner end of this tubular journal is provided with an annular flange $d'$, which fits snugly within a recess in a collar $e'$, secured rigidly upon the main axle. This recessed or flanged collar, together with the flange on the journal, prevents sand and dust getting into the journal, as is evident. The interior of the tubular journal, a short distance from its inner end, is enlarged to form a supplemental lubricating-chamber $f$, which surrounds the beveled portion $c$ of the axle. This lubricating-chamber is fed from the journal-box, (shown in dotted lines in Fig. 2,) the oil being drawn in between the axle and tubular journal by the motion of the same. By locating this lubricating-chamber in this place a thorough lubrication of the contacting portions of the axle, the recessed collar, and flanged end of the journal $d$ is insured.

The divided collar fits snugly in its groove in the axle and abuts loosely against the outer end of the tubular journal $d$, thereby serving not only to attach the two wheels together, but also to assist in holding the bearing-block $g$ (shown in dotted lines in Fig. 2) in place upon the journal. This collar is constructed, preferably, of two semicircular sections pivoted together. The pivotal pin of this collar may be surrounded by a small coiled spring $m$, for the purpose of holding the two sections together and permit of their ready separation for removal. Preferably one end of one of the sections is provided with a projection $h$, which fits within a corresponding recess in the adjacent end and assists in preventing independent lateral movement of the sections of the collar.

It will be observed that the car-wheels will have an independent movement of each other, which will be particularly advantageous in turning curves, inasmuch as it will reduce the friction and prevent twisting and straining.

Having thus fully described my invention, what I claim, and desire to secure by Letters Patent, is—

1. The combination of an axle provided at one end with a car-wheel $b$ and having its other end reduced, as at $c$, a stationary flange $e'$, secured on the larger portion of said axle and provided in its face with a recess, a tubular journal $d$, placed upon the reduced portion $c$ of the axle and provided at its inner end with an annular flange $d'$, which fits within the recessed flange $e'$, the interior of this tubular journal being somewhat enlarged to embrace the inner end of the larger portion of the axle and form a supplemental lubricating-chamber $f$, and a car-wheel $b'$ upon the said tubular journal, substantially as and for the purpose described.

2. The combination of a car-axle provided with a car-wheel $b$ at one end and an annular groove in its other end, a tubular journal slipped upon the grooved end of the said axle, a stationary recessed flange $e'$, secured upon the axle and adapted to receive and form an abutment for the inner end of the said tubular journal, a car-wheel $b'$ upon the said tubular journal, and a removable divided collar $e$, secured in the groove in the end of the axle, this collar serving to retain the tubular journal in place on the axle, and also keep the journal-block of the journal-box in position, substantially as and for the purpose described.

In testimony whereof I affix my signature in presence of two witnesses.

JOHN M. MAY.

Witnesses:
E. M. SCOTT,
WM. GLENN.